W. ECKER.
TOOL HOLDER AND GUIDE COMBINATION.
APPLICATION FILED MAY 31, 1917.
1,253,799.
Patented Jan. 15, 1918.
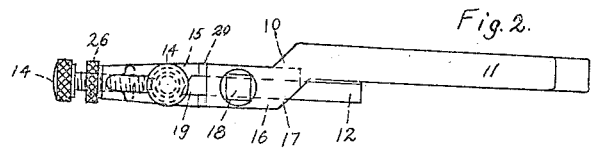
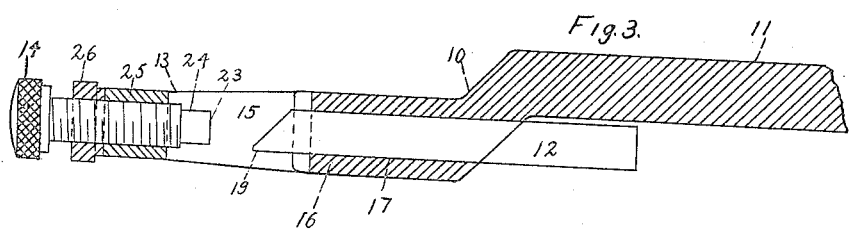
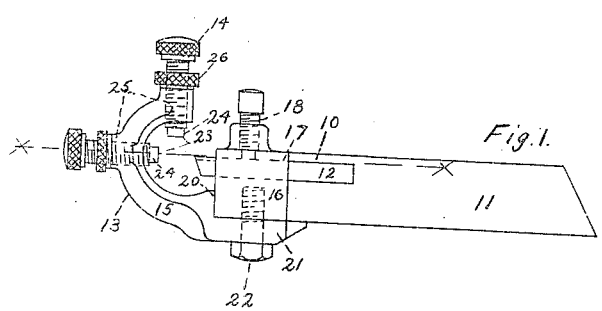
INVENTOR.
Walter Ecker.
By Louis M. Schmidt
Atty.

UNITED STATES PATENT OFFICE.

WALTER ECKER, OF MIDDLETOWN, CONNECTICUT, ASSIGNOR OF ONE-HALF TO PER H. CARLSON, OF MIDDLETOWN, CONNECTICUT.

TOOL-HOLDER AND GUIDE COMBINATION.

1,253,799. Specification of Letters Patent. Patented Jan. 15, 1918.

Application filed May 31, 1917. Serial No. 171,965.

*To all whom it may concern:*

Be it known that I, WALTER ECKER, a citizen of the United States, residing at Middletown, in the county of Middlesex and State of Connecticut, have invented certain new and useful Improvements in Tool-Holder and Guide Combinations, of which the following is a specification.

My invention relates to improvements in tool-holder and guide combinations, for use in lathe work, and the object of my improvement is to produce in a unitary device to be supported from the tool-post of a lathe a tool-holder for holding the cutting tool and in combination therewith a steadying device for steadying and backing the work during the turning operation, and which is especially adapted to facilitate the correct turning of relatively long and slender rods.

In the accompanying drawing:—

Figure 1 is a side elevation of my improved tool-holder and guide combination.

Fig. 2 is a plan view of the same.

Fig. 3 is a sectional view, on an enlarged scale, on the line x x of Fig. 1.

My improved tool-holder and guide combination comprises a tool-holder portion 10 having a shank 11 at one end suitable for being received in the tool-post of a lathe and at the other end having means for holding the tool 12 and a guide portion 13 at the said other end composed of a set of backing screws 14 for backing and steadying the work, the said screws 14 being mounted in a bracket 15 that is supported from the tool-holder portion 10.

The tool-holder portion 10 comprises the shank 11 that is straight and of the usual form and at the inner end of the said shank 11 is an off-set portion 16 that serves as the tool-holder proper, being provided with an opening 17 of square cross section to fit the tool 12 and having a set-screw 18 for holding the tool 12 in place. The opening 17 is parallel with the axis of the shank 11 and the off-set of the holder portion 16 is at the left in the position for use in the lathe and sufficient in amount so that the opening 17 extends entirely through the holder portion 16, permitting excess length of the tool stock of which the tool 12 is formed to extend rearwardly from the said opening 17. The tool 12 is shaped as usual so that the upper left corner 19 serves as the cutting edge portion, and the guide means to be described are adapted to coöperate with this position of the cutting portion of the tool 12.

The bracket 15 comprises at the supporting end a shoulder 20 that abuts against the end of the holder portion 16 and an arm 21 that extends along the underside of the said holder portion 16, being held in place by the screw 22. From the said supporting end the bracket 15 extends around in circular form on the opposite side of the work from that of the tool 12, suitably to support the backing or steadying screws 14.

The said backing screws are two in number and positioned as follows:—one of the screws 14 serves as the rear screw and is positioned normally horizontally and directly opposite the cutting portion 19 of the tool 12; and the other screw 14 is positioned vertically and directly above the work. In use the end faces 23 are in bearing contact with the work and the details of the structure are so arranged that the said contact faces 23 bear against the turned portion of the work, the travel of the tool in use being from the right toward the left, *i. e.*, the contact faces 23 being to the right of the cutting portion 19.

Considering further construction details, the axis of the opening 17 and the axes of the screws 14 are in one plane, which normally is at right angles to the axis of the work; the tool 12 fills the opening 17 and therefore the cutting portion 19 is to the left of the said plane; therefore, by having the end portions 24 of the screws 14 reduced, as shown, to a diameter less than the width of the tool 12 the contact faces 23 can be finished flat and can be adjusted to make a line contact with the finished part of the work, just back of the cutting portion 19.

The backing screws 14 are positioned in radial screw-threaded holes 25 in the frame 15 and are provided with lock-nuts 26.

In use, the pressure of the cutting tool tends to bend the work upwardly and backwardly, and the two backing screws 14 positioned as described are adapted to resist the same and thus steady the work for the cutting operation.

By having the tool holder portion 16 off-set relatively to the shank portion 11, as described, the cutting tool 12 is removable from the tool receiving opening 17 by being drawn rearwardly through the said opening, without displacing the backing screw supporting bracket 15. Thus the said bracket 15 and the tool holder portion 16 are operatively a rigid and unitary structure, the two part structure used for these parts serving merely as a convenient means of construction.

The cutting edge portion 19 of the tool is substantially confined to the upper left hand corner of the tool end and the bearing ends 23 of the backing screws are reduced, as mentioned, so as to be of less width or diameter than the width of the tool, the combined arrangement described therefore permitting the axis of the tool and the axes of the backing screws to be positioned in the same radial plane with the backing screws in operative position coöperating with the cutting tool.

Thus the closeness of the bearing ends 23 of the backing screws to the path or zone on the work that is operated upon by the cutting edge portion of the tool, which, as mentioned, for the particular case shown, is the upper left corner portion of the tool, is determined by the diameter of the reduced end portion of the backing screws, which closeness in the structure shown and described, may be reduced to a minimum, and can be varied to suit a particular case by changing the backing screws.

By substituting for the tool shown one that cuts at the upper right hand corner the device is adapted, without other change, to operate with the tool being fed along the work from the left toward the right.

I claim as my invention:—

A tool-holder and guide combination comprising a rigid and unitary structure composed of a shank at one end, a guide screw bracket at the other end, and a tool-holder intermediate the said ends, the said tool-holder being off-set relatively to the said shank and in parallelism therewith and having a longitudinal tool opening positioned in off-set relation to the said shank, a tool of uniform cross-section, fitting in and substantially filling the said opening, and having one corner formed for a cutting edge, backing screws supported by the said bracket and adapted to coöperate with the said cutting edge, by their end faces, for backing against work positioned in the space between the said end faces and the said cutting edge, and the said end faces being slightly smaller in diameter than the width of the said tool so as to present a bearing surface for engaging with the work that is close to the cutting zone of the tool.

WALTER ECKER.

Witnesses:
HELMER CARLSON,
KATHERINE I. BOWEN.

Copies of this patent may be obtained for five cents each, by addressing the "Commissioner of Patents, Washington, D. C."